United States Patent [19]
Koyama et al.

[11] Patent Number: 5,325,521
[45] Date of Patent: Jun. 28, 1994

[54] WAIT CONTROL DEVICE

[75] Inventors: Kazumi Koyama; Yuichi Nakao, both of Itami, Japan

[73] Assignee: Mitsubishi Denki Kabushiki Kaisha, Tokyo, Japan

[21] Appl. No.: 146,473

[22] Filed: Nov. 1, 1993

Related U.S. Application Data

[63] Continuation of Ser. No. 660,194, Feb. 22, 1991, abandoned.

[30] Foreign Application Priority Data

Feb. 26, 1990 [JP] Japan ................................ 2-46265

[51] Int. Cl.⁵ .............................................. G05F 11/34
[52] U.S. Cl. ........................ 375/575; 364/270.6; 364/270.4; 364/270.7; 364/DIG. 1; 395/550
[58] Field of Search ............... 371/16.1, 16.2, 16.3, 371/61, 62; 364/270.7, 270.6, 270.4, 270, 267.9; 395/575, 550

[56] References Cited

U.S. PATENT DOCUMENTS

| | | | |
|---|---|---|---|
| 4,092,714 | 5/1978 | Norton et al. | 364/200 |
| 4,306,288 | 12/1981 | Nakamura | 364/200 |
| 4,785,416 | 11/1988 | Stringer | 371/16.2 |
| 4,796,211 | 1/1989 | Yokouchi et al. | 371/16.3 |
| 4,802,164 | 1/1989 | Fukuoka et al. | 371/16.1 |
| 4,803,682 | 2/1989 | Hara et al. | 371/16.3 |
| 4,809,280 | 2/1989 | Shonaka | 371/16.3 |
| 4,851,987 | 7/1989 | Day | 364/200 |
| 4,974,144 | 11/1990 | Long et al. | 371/8.2 |
| 5,012,435 | 4/1991 | Bailey et al. | 371/16.3 |
| 5,097,470 | 3/1992 | Gihl | 371/16.3 |
| 5,123,102 | 6/1992 | Puckette | 395/550 |

*Primary Examiner*—Robert W. Beausoliel, Jr.
*Assistant Examiner*—Phung My Chung

[57] ABSTRACT

A wait control device according to the present invention instructs a central processing unit (CPU) to wait for the start of its operation until the device receives a process completion signal from a memory unit or an I/O unit, and comprises setting means for setting the time of said CPU to wait for the start of its operation in the memory unit or the I/O unit accessed by the CPU, judgement means for judging system operation to be time out error when no process completion signal is presented during said time of the CPU, and selector means for selecting whether it passes a signal concerning the judgement of the time out error or successively waits for said processing completion signal.

8 Claims, 7 Drawing Sheets

|  | EXAMPLE 1 | EXAMPLE 2 |
|---|---|---|
| PAGE REGISTER | 000000000000B | 010000000000B |
| DON'T - CARE REGISTER | 000001111111B | 101111111111B |
| ASSIGNED PAGE | 00000XXXXXXB | X1XXXXXXXXXXB |
| ASSIGNED ADDRESS | 00000000H ~07FFFFFFH | 40000000H ~7FFFFFFFH |
|  |  | C0000000H ~FFFFFFFFH |
|  | ADDRESS SPACE | ADDRESS SPACE |

NOTE: B: BINARY NOTATION
H: SEXIDECIMAL

*FIG. 4.*

(PRIOR ART)

WAIT CONTROL DEVICE

This is a continuation of application Ser. No. 07/660,194, filed Feb. 22, 1991, now abandoned.

BACKGROUND OF THE INVENTION

1. Field of the Invention

The present invention relates to a wait control device for instructing a central processing unit (CPU) to wait for the start of its operation until the device receives a processing completion signal from an external peripheral device.

2. Description of the Prior Art

Figure 5:
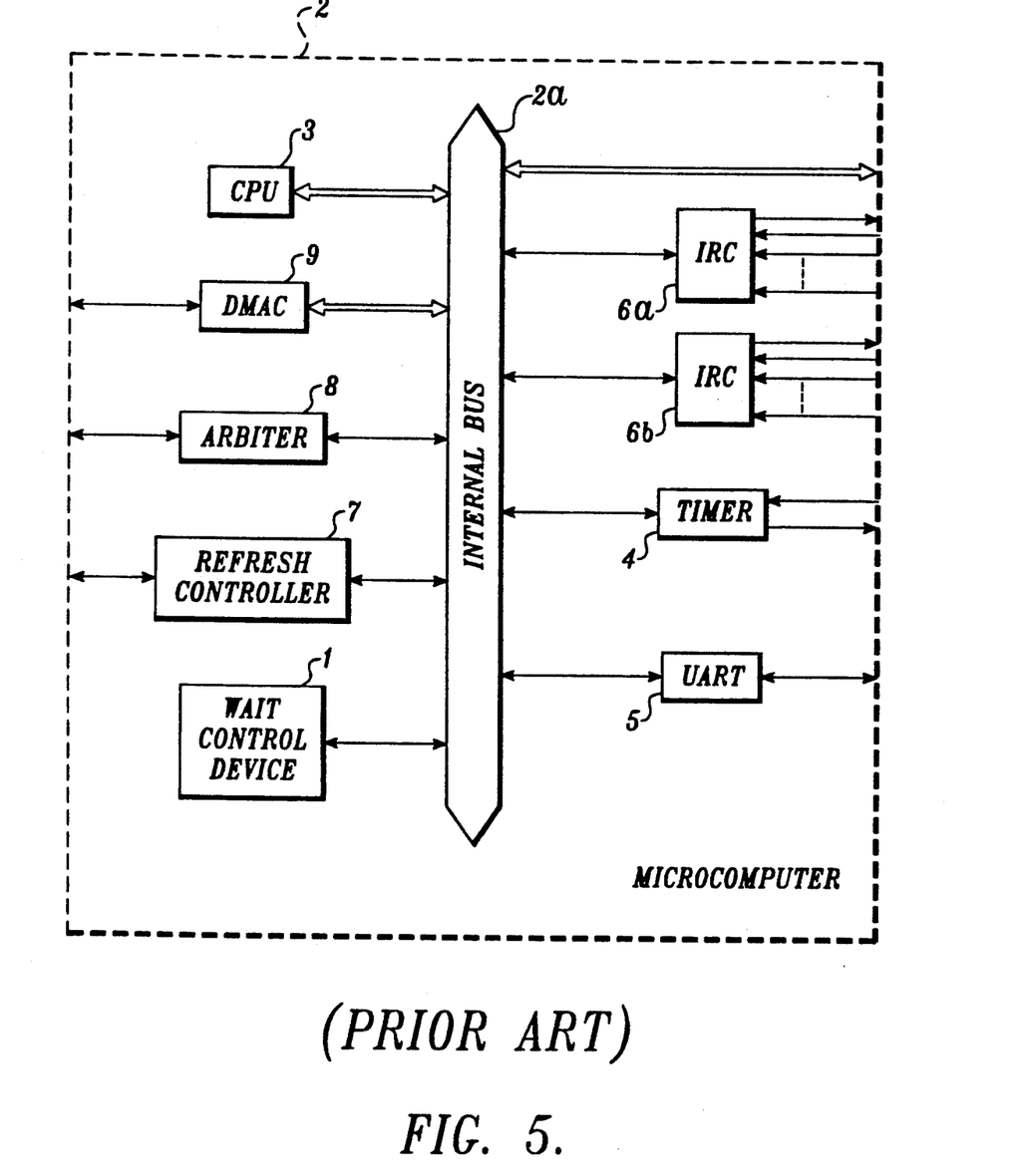
FIG. 5 is a block diagram of a microcomputer incorporating a prior wait control device.

In a prior wait control device, a memory address space and an input/output (I/O) device space are divided, respectively, and to the divided subspaces wait number are assigned, and further a timing signal indicative of data having been prepared is sent to a bus master with use of a signal fed from a bus slave. The wait control device 1 is disposed in a one-chip microcomputer 2 and is connected to a central processing unit (CPU) 3 and a timer 4, universal asynchronous receiver transmitter (UART) 5, first and second interrupt controllers (IRC) 6a, 6b, refresh controller 7, arbiter 8, and direct memory access controller (DMAC) 9, through an internal bus 2a, as illustrated in FIG. 5.

Figure 6:
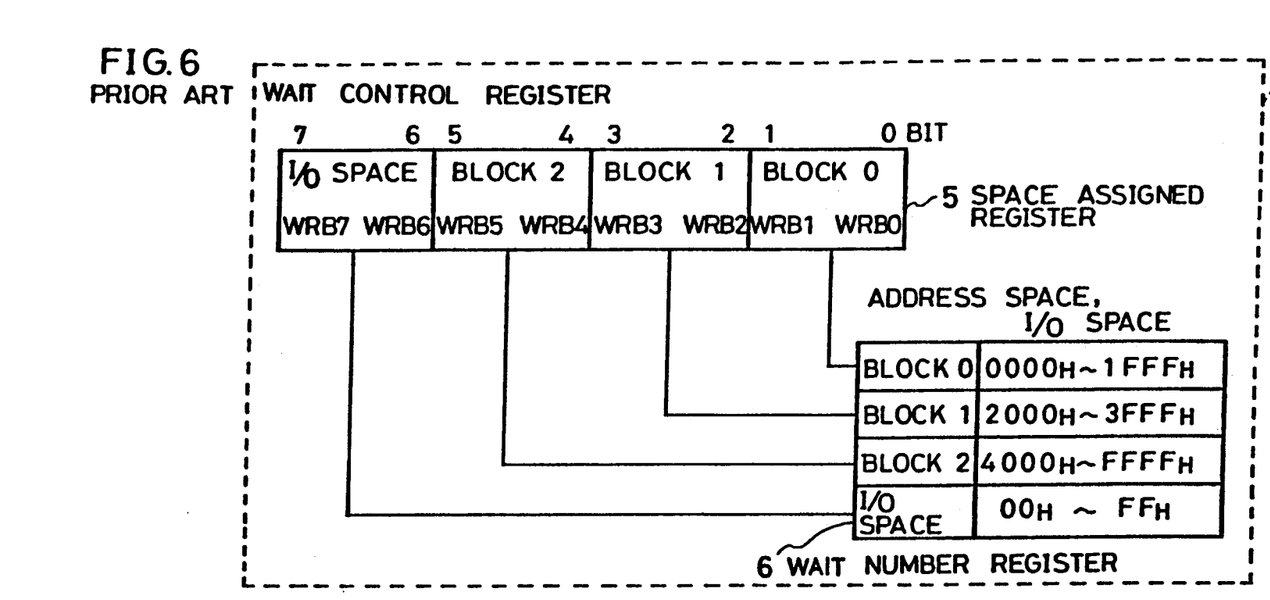
FIG. 6 is a block diagram of the prior wait control device of FIG. 5.
Figure 7:
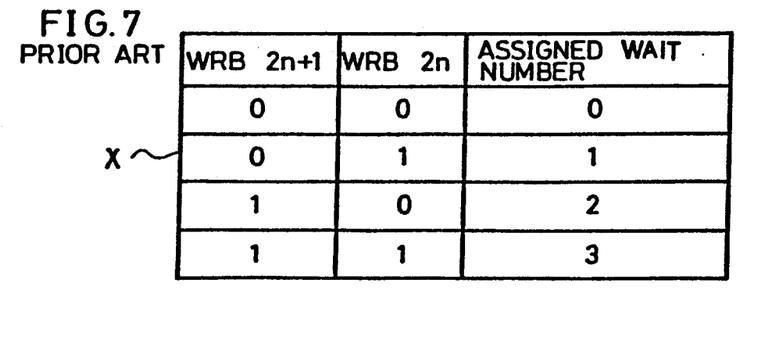
FIG. 7 is a diagram illustrating the state of setting of a wait number in the prior wait control device.

Referring now to FIGS. 6 and 7, the prior wait control device will be described. Designated at 1 is a wait control resister as the wait control device. The wait control register 1 formed of a wired-logic comprises a space-assigned register 5 in which an address space and an I/O space have previously been assigned by hardware, and a wait number register 6 to set the wait numbers of the above spaces. The space-assigned register 5 has addresses "$0000_H$" to "$1FFF_H$" in the memory address space assigned to BLOCK 0 thereof, addresses "$2000_H$" to "$3FFF_H$" in the same assigned to BLOCK 1 thereof, addresses "$4000_H$" to "$FFFF_H$" in the same assigned to BLOCK 2 thereof, and addresses "$00_H$" to "$FF_H$" of the I/O space assigned to BLOCK 3 thereof. The wait number register 6 is formed of 8 bit registers, to which numerals are set to specify the wait numbers of the respective BLOCKs 0 to 3. A table X of FIG. 7 lists the assigned wait numbers for each of the BLOCKs, each number comprising 2 bits for example. For example, in order to assign the wait number of the BLOCK 0 to "2" the WRB0 and WRB1 in the wait number register 6 may be set to "0" and "1", respectively, and in order to assign the wait number of the BLOCK 1 to "1" the WRB2 and WRB3 in the wait number register 6 may be set to "1" and "0", respectively. The wait numbers should be set with enough time compared with processing speeds posssessed by individual external devices. When a CPU takes an access to a memory device such as a ROM, a SRAM, and a DRAM, etc., which have different access times, respectively, it is necessary to set a required number of the wait numbers corresponding to the response times of such memory devices.

In the prior wait control device described above, the address space and the I/O space were divided, and the wait numbers were assigned to respective divided subspaces, and further a timing signal indicative of data being ready was sent to the bus master using a signal fed from the bus slave. Therefore, the bus master and the CPU must keep their waiting states until the signal is fed from the bus slave. This is a very severe when use is made of a low speed I/O and in particular when the I/O has any failure.

SUMMARY OF THE INVENTION

In view of the drawbacks with the prior art, it is an object of the present invention to provide a wait control device capable of outputting a time out error if a processing completion signal from the memory device or the I/O device does not fall within a predetermined time when the central processing unit waits for the start of its operation, and of arbitrarily setting said predetermined time, and further of selecting whether or not it should output said time out error.

To achieve the above object, a wait control device according to the present invention instructs a central processing unit to wait for the start of its operation until the device receives a processing completion signal from a memory device or an I/O unit, and comprises setting means for setting the wait time of said central processing unit in the memory device or the I/O unit to which the central processing unit has an access, judgement means for judging the system operation to be a time out error when no processing completion signal is presented during said wait time, and selector means for selecting whether it should output a signal concerning the judgement of the time out error by said judgement means or should successively wait for said processing completion signal.

The above and other objects, features, and advantages of the invention will become more apparent from the following description when taken in conjunction with the accompanying drawings.

DESCRIPTION OF THE PREFERRED EMBODIMENT

In what follows, a wait control device of an embodiment according to the present invention will be described with reference to FIGS. 1 to 4.

Figure 1:
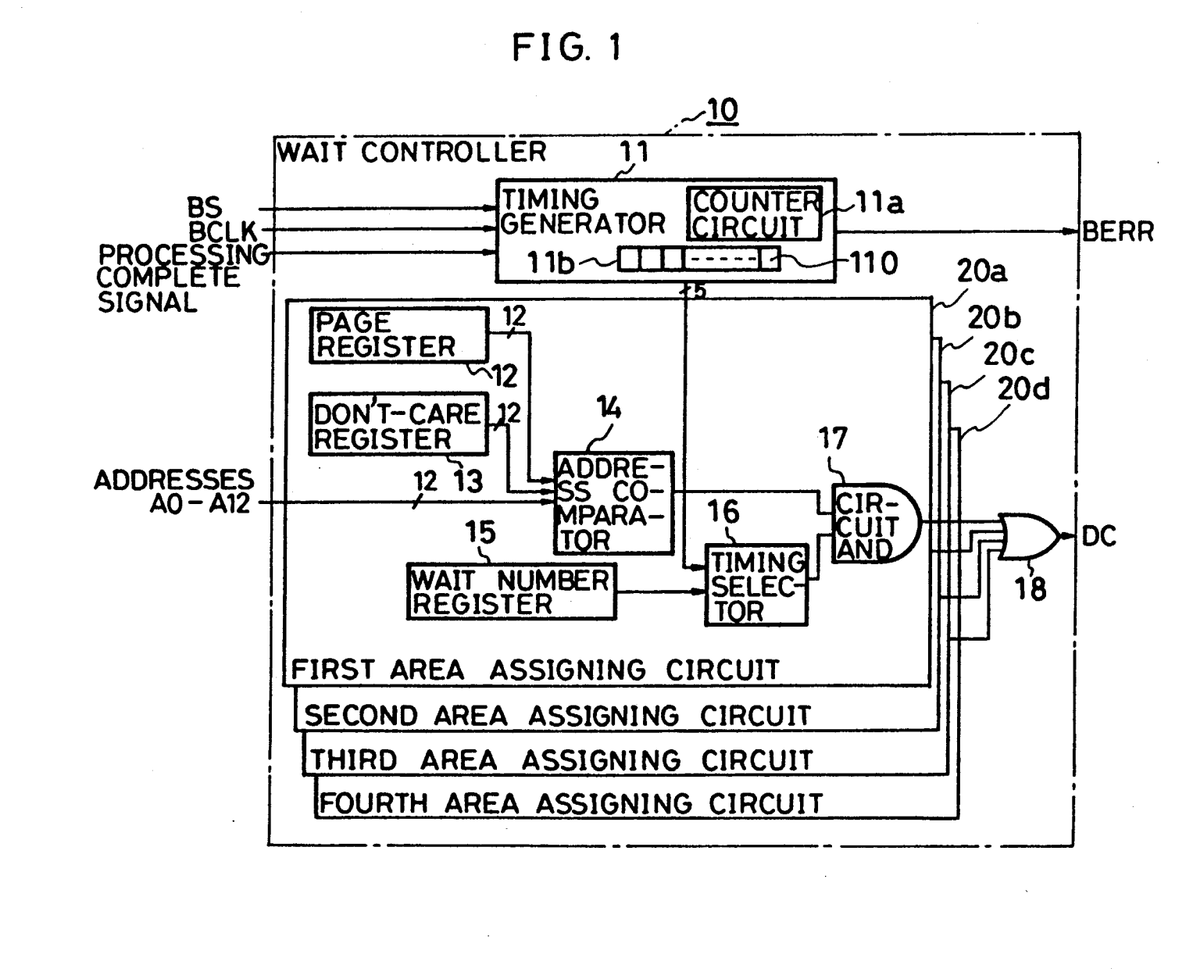
FIG. 1 is a block diagram of wait control device of an embodiment according to the present invention.
Figure 2A:
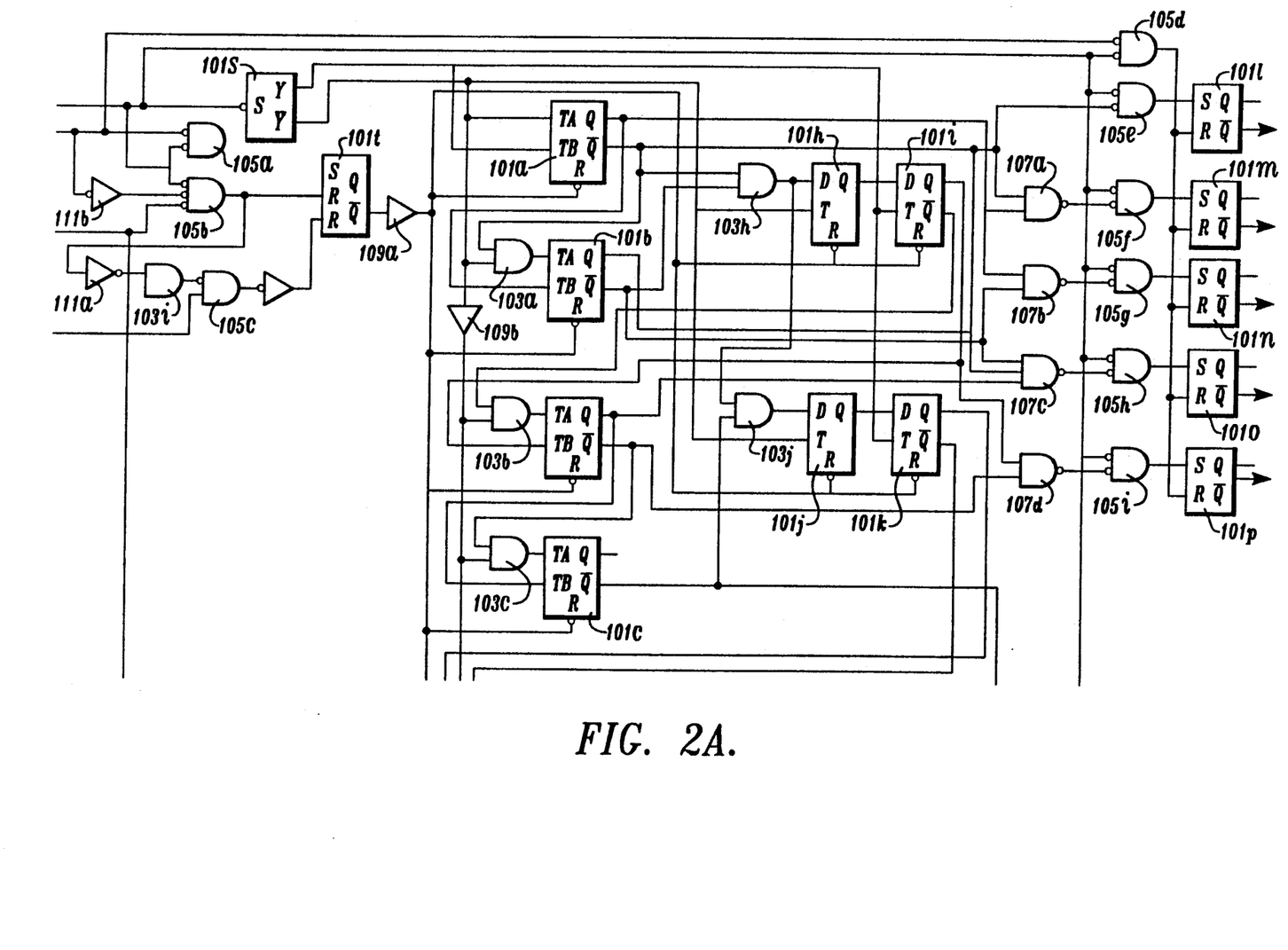
FIGS. 2 and 3 are circuit diagrams of a timing generating and a timing selector in the wait control device of the embodiment of FIG. 1, respectively.
Figure 2B:
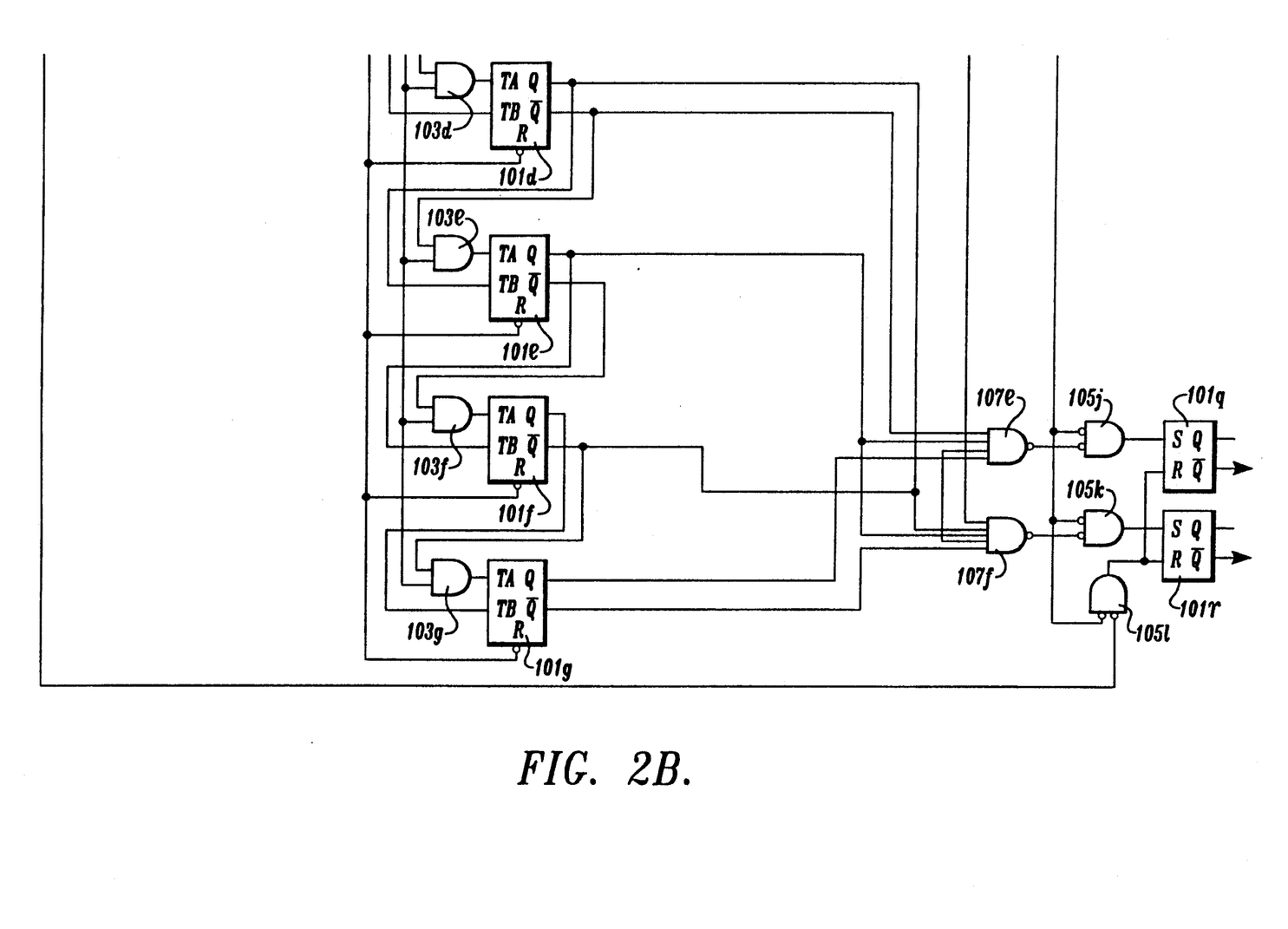
Figure 3:
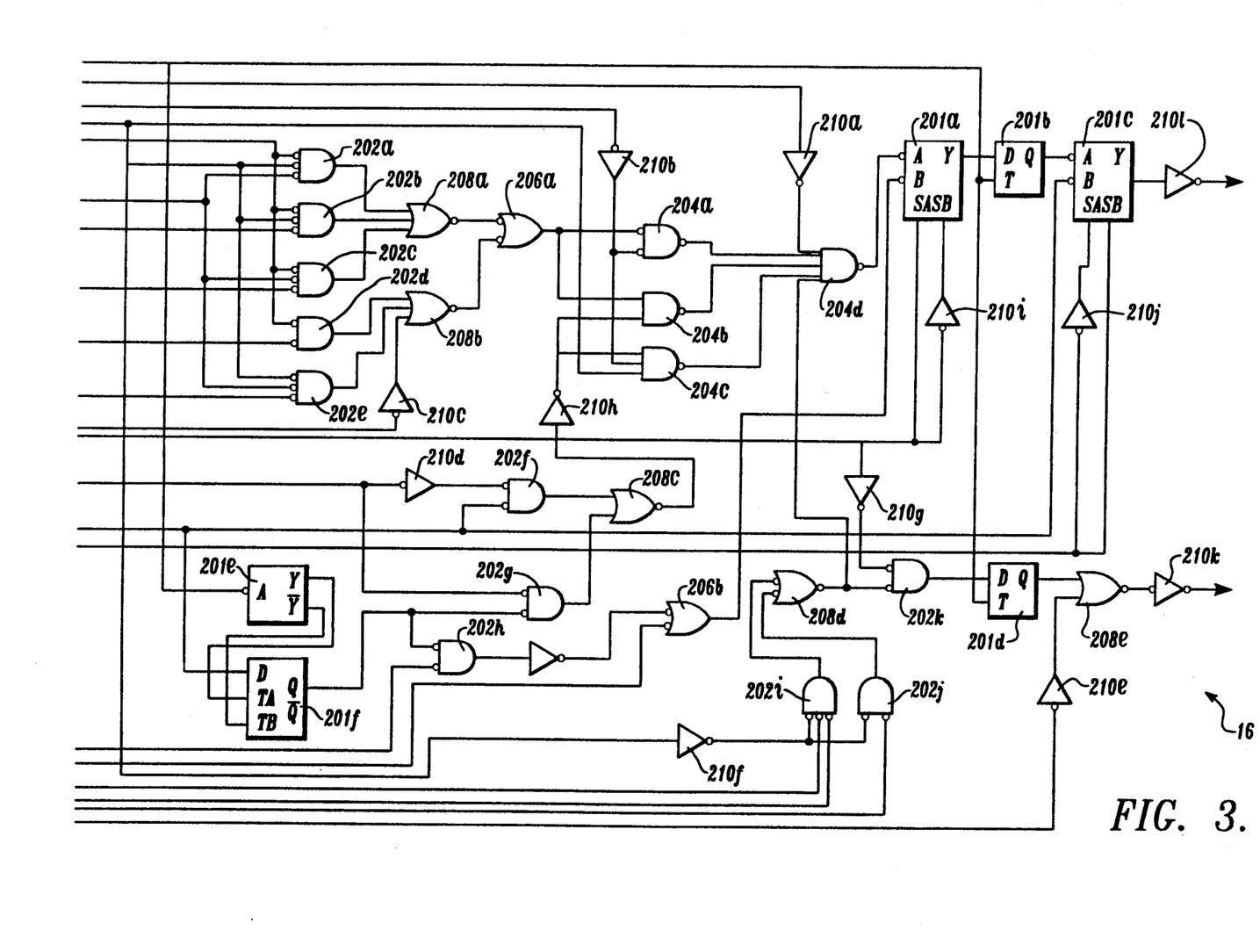
Figure 4:
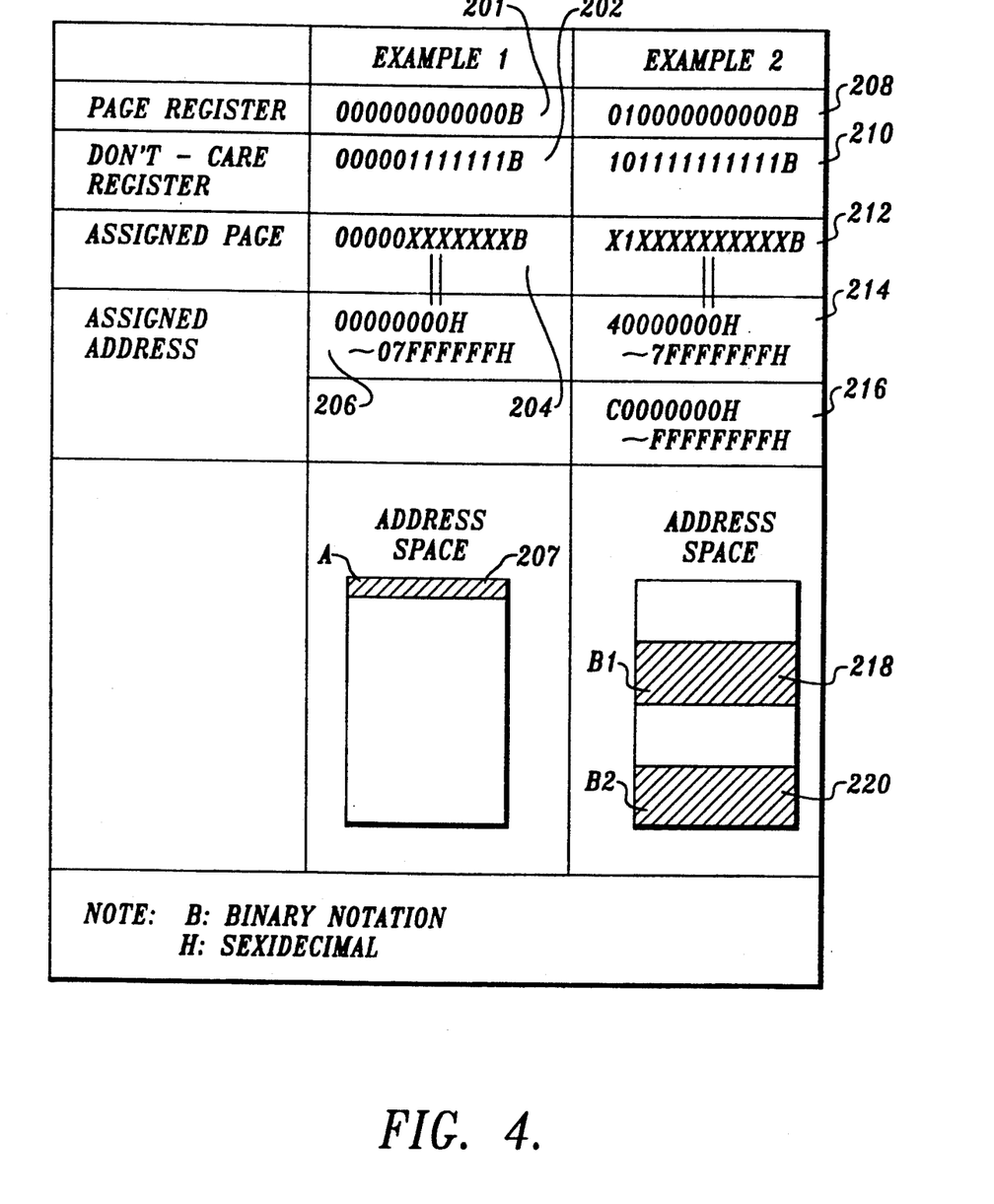
FIG. 4 is a view illustrating an access space of the wait control device of the embodiment.

As shown in FIG. 1, numerals 10 and 11 designate a wait controller and a timing generator, respectively. The timing generator 11 comprises a counter circuit 11a for counting a bus clock (BCLK) signal and a counter register 11b as judgement means including a select bit (selector means) I/O for setting a count and specifying whether or not it should output a time out error (BERR), as shown in FIG. 2 for example, including flip flops 101a–101t, AND gates 103a–103i, negated AND gates 105a–105l, AND gates 107a–107f, buffers 109a, 109b and inverters 111a, 111b. The timing generator 11 receives the BCLK signal, a bus start (BS) signal, and a processing completion signal from a bus master (not shown) and delivers a wait signal and a data completion (DC) timing signal which is to instruct a CPU to wait for the start of its operation. The timing generator 11 further delivers the BERR signal to the bus master. Designated at 12 is a page register and 13 is a don't car register. These two registers 12, 13 consist of 12 bits and have address spaces each divided arbitrarily with 1M byte page as a basic unit, respectively. With the page register 12 being of "000000000000$_B$" (201) and the don't care register 13 of "000001111111$_B$", (202) for example, a page "00000XXXXXXX$_B$" is assigned and an address "0000 0000$_H$" ~"07FFFFFF$_H$" (206) assigned, as indicated by A (207) in FIG. 4. Additionally, with the page resister 12 being of 010000000000$_B$" (208) and the don't car register 13 of "101111111111$_B$", (210) a page "X1XXXXXXXXXX$_B$" (212) and addresses "40000000$_H$" ~"7FFFFFFF$_H$" (214) and "C0000000$_H$" ~"FFFFFFFF$_H$" (216) are assigned, respectively, as indicated by areas B1 (218), B2 in FIG. 4 (here, $_B$ designates a binary notation and $_H$ a hexadecimal notation.). Designated at 14 is an address comparator which is to compare the address spaces divided by the page register 12 and the don't car register 13 with addresses A0~A12 fed from the CPU and output an address signal if the accessed addressed is coincident with any of the divided address subspaces. Designated at 15 is a wait number register as setting means for setting the wait number of the address space divided by the page register 12 and the don't care register 13. Designated at 16 is a timing selector which is constructed as shown in FIG. 3, including flip flops 201a-201f, negated AND gates 202a-202k, NAND gates 204a-204d, negated OR gates 206a-206b, NOR gates 208a-208e, inverters 210a-210l and outputs a signal assigned by the wait number register 15 in the wait signal of the timing generator 11. Designated at 17 is an AND circuit which outputs a DC signal from the timing selector 16 in a timing assigned as the address space is selected. First through fourth area assigning circuits 20a through 20d, each capable of independently setting the waits numbers therein, constituted by the aforementioned registers 12, 13, address comparator 14, wait register 15, timing selector 16, and AND circuit 17. Designated at 18 is an OR circuit which is to transmit a DC signal of an accessed address area among the DC signals from the first through fourth area assigning circuits 20a through 20d concerning respective areas assigned by those circuits 20a through 20d to the bus master for the CPU, a direct memory access control (DMAC), and the like.

In the following, operation of the wait control device will be described.

In the timing generator 11, the counter circuit 11a starts to count the BCLK signal when the BS signal becomes effective, and outputs a timing of the counts and a count signal to the timing selector 16. When an address accessed by the CPU corresponds to any address space of the first through fourth area specification circuits 20a through 20d set to the page register 12 and the don't care register 13, the address comparator 14 outputs a select signal of the address space. Additionally, the DC signal corresponding to the wait number set in the wait number register 15 is outputted on the basis of the count signal from the timing generator and is made effective if the AND circuit 17 has outputted the selection signal of the address space. The DC signal is thus outputted through the OR circuit 18 to the bus master, and transferred to the CPU through the bus master to instruct for the CPU to wait for the start of its operation. When the wait controller 10 receives the processing completion signal from the I/O, etc., with a value less than that set the counter register 11b (i.e., within the set time), no time out error is attained without issurance of the BERR signal. Alternatively, it judges the operation to be time out error when it receives the processing completion signal. Further, even if the time out error is judged to exist, no BERR signal is issued also when the select bit 110 does not make the BERR signal effective, e.g., also when the select bit 110 is "0", and the wait controller 10 keeps on waiting for the processing completion signal. However, when the select bit 110 makes the BERR signal effective, e.g., when the select bit 110 is "1", the BERR signal is outputted to the bus master and the CPU processes the operation as time out error.

In the above arrangement, the first through fourth area assigning circuits 20a through 20d can set an arbitrary memory address space, and I/O space, and an arbitary wait numbers. Additionally, the wait number register 15 can set the time of the processing wait state in the memory or the I/O to which the CPU has an access. Accordingly, the processing waiting state can be set responsibility to the response times of the memory and the I/O. If there is no processing waiting state within this set time, the count register 11b can judge the operation to be time out error without keeping the CPU on its waiting state. Moreover, it can be selected by the select bit 110 whether the time out error judged by the counter register 11b should be outputted or the process completion signal should be waited.

Furthermore, the system can be facilitated in timing design and be miniaturized by providing the wait controller 10 and the CPU, etc., integrally on the same semiconductor chip.

According to the present invention, as described above, the wait control device can set through the setting means the time of the CPU's waiting for its operation in the external peripheral unit accessed by the CPU. Accordingly, it assures such a waiting time state of the CPU in response to response times of a memory unit and an I/O unit. Additionally, the wait control device can judge through the judgement means system operation to be time out error when there is no processing completion signal within the set time. Thus, it is not required for the CPU to keep its processing wait state. The wait control device can therefore rapidly detect any abnormal operation of the external peripheral unit as well as can select whether it should output the time out error by said judgement means or successively wait for the processing completion signal, thereby assuring its flexible acceptance to a versatile system.

What is claimed is:

1. A wait control device in a computer, said wait control device being coupled to a bus clock signal line said computer including at least a second device said second device being one of a memory device and an I/O unit, said memory device and said I/O unit having addresses which define at least one address space, said wait control device, comprising:

means for instructing a central processing unit to cause the CPU to suspend operation until said device receives a first signal from said second device indicating completion of processing by said second device;

setting means separate from said CPU, in which a length of time during which the central processing unit suspends operation, is preset by hardware, said setting means being coupled to said means for instructing, judgment means, separate from said CPU, for generating a time out error signal when said first signal is not presented during said length of time, said judgment means being coupled to said setting means; and selector means, separate from said CPU, for selecting, based on stored information, whether said wait control device should output the time out error signal in order to selectively permit said wait control device to wait for said first signal, said selector means being coupled to said judgment means.

2. A wait control device according to claim 1 wherein the wait control device includes a timing generator which outputs a wait signal, said timing generator including a counter circuit for counting a bus clock signal received from said bus clock signal line and wherein said judgment means comprises a counter register, coupled to said counter circuit, said counter register storing a plurality of bits, including a select bit and wherein said selector means comprises said select bit, and wherein said setting means comprises a first wait number register, said first wait number register storing a first wait number.

3. A wait control device according to claim 2 further comprising an area-specification circuit, comprising means for defining at least a first address range of said address space and an address comparator means, for outputting an address signal when an address accessed by the CPU is one of the addresses in said first address range, said address comparator means being coupled to said mans for defining, a timing selector means for outputting a signal specified by the wait number register during the time the wait signal is outputted from the timing generator; and means, coupled to said address comparator means and to said timing selector means, for selectively outputting a first wait controller signal for instructing the CPU to cause the CPU to suspend operation for a length of time depending upon said address space being selected.

4. A wait control device according to claim 3 further comprising a second area-specification circuit said second area-specification circuit including a second wait number registerion for independently setting a second wait number, different from said first wait number, said second area-specification circuit outputting a second wait controller signal and wait controller device also comprising an OR circuit for outputting one of said first wait controller signal and said second wait controller signal.

5. A device as claimed in claim 3, wherein said means for defining further comprises first and second bit registers coupled to said address comparator.

6. A wait control device according to claim 1, wherein the wait control device includes a timing generator which comprises a counter circuit and a counter register, said counter circuit functioning as said instruction means, counting a bus clock signal received from said bus clock signal line during a time period from the reception of a bus start signal to the reception of said first signal and outputting its count value corresponding to a length of time during which said CPU suspends operation of said CPU;

said counter register storing a plurality of bits, coupled to said counter circuit, functioning as set setting means in which a length of time during which said CPU suspends operation set in accordance with said second device, comprising a group of judgment bits as said judgment means for comparing the set value with a count value of said counter circuit and for outputting the time out error signal and a select bit as said selector means;

and said timing generator outputting a timing signal for a count value of said counter circuit.

7. A wait control device in a computer having a memory device and an I/O unit, said wait control device comprising:

means for instructing a central processing unit to suspend operation unit said wait control device receives a signal indicative of completion of processing from one of said memory device and said I/O unit;

setting means located in said one of said memory device and said I/O unit accessed by said central processing unit for setting a length of time during which the central processing unit suspends operation;

judgment means, coupled to said setting means, for generating a time out error signal when said signal indicative of completion of processing is not presented during said length of time;

selector means, coupled to said judgment means, for selecting whether said wait control device should output the time out error signal;

a plurality of area-specification circuits, each coupled to said means for instructing, each of said plurality of area-specification circuits comprising two registers for dividing and specifying an address space and an I/O space in a memory device and an address comparator for comparing the address space specified by the registers with an address from said central processing unit; and an OR circuit, coupled to each of said plurality of area-specification circuits, for outputting the time out error signal and a signal indicative of one of said plurality of area-specification circuits accessed by said central processing unit.

8. A wait control device in a computer having a plurality of memory devices and a plurality of I/O units, said wait control device comprising:

means for supplying a plurality of lengths of time to a CPU until said wait control device receives a signal indicative or completion of processing from said plurality of memory devices and said plurality of I/O units and for instructing said CPU to suspend operation in accordance with the plurality of lengths of time;

setting means separate from said CPU, coupled to said instruction means, and in which the plurality of lengths of time required for said CPU to suspend operation are set by hardware or other means in accordance with address spaces in said plurality of memory devices and said plurality of I/O units to be accessed by said CPU;

judgment means for generating a time out error signal when no signal indicative of completion of processing is generated within a length of time required for said CPU to suspend operation in accordance with the address spaces in said plurality of memory devices and said plurality of I/O units accessed by said CPU;

selector means, coupled to said judgment means, for selecting whether or not the time out error signal should be effective;

a plurality of area-specification circuits, each coupled to said instruction means, each of said plurality of area-specification circuits comprising:

a wait number register in which a length of time required for said CPU to suspend operation is set in accordance with one of the address spaces in said plurality of memory devices and said plurality of I/O units accessed by said CPU;

two registers for dividing and specifying one address space in said plurality of memory devices and said plurality of I/O units accessed by said CPU;

an address comparator for comparing an address in the address space specified by said registers and an address received from said CPU and for generating an address signal when an address accessed by said CPU is the address in the address space;

a timing selector for receiving the plurality of lengths of time during which said CPU suspends operation received from said instruction means when the time out error signal is not generated and the timing signal thereof and for outputting the length of time set in said wait number register;

a logic circuit for detecting the address signal from said address comparator and the length of time from said timing selector and outputting a wait control signal; and an OR circuit, coupled to each of said area-specification circuits, for outputting a wait control signal from one of said area-specification circuits accessed by said CPU to said CPU as a data complete signal.

* * * * *